United States Patent
Zhang

(10) Patent No.: US 10,003,213 B2
(45) Date of Patent: Jun. 19, 2018

(54) POWER ADAPTER

(71) Applicant: GUANGDONG OPPO MOBILE TELECOMMUNICATIONS CORP., LTD., Dongguan (CN)

(72) Inventor: Jialiang Zhang, Dongguan (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days. days.

(21) Appl. No.: 15/403,680

(22) Filed: Jan. 11, 2017

(65) Prior Publication Data

US 2017/0126050 A1 May 4, 2017

Related U.S. Application Data

(63) Continuation of application No. PCT/CN2016/074907, filed on Feb. 29, 2016.

(30) Foreign Application Priority Data

Mar. 6, 2015 (CN) .......................... 2015 1 0100431

(51) Int. Cl.
  *H02J 7/04* (2006.01)
  *H02M 7/217* (2006.01)
  *H02J 7/00* (2006.01)

(52) U.S. Cl.
  CPC .............. *H02J 7/04* (2013.01); *H02J 7/0029* (2013.01); *H02M 7/217* (2013.01)

(58) Field of Classification Search
  CPC .. H02J 7/00; H02J 7/04; H02J 7/0029; H02M 7/217; H02M 1/4208; H02M 1/4225; Y02B 70/126

(Continued)

(56) References Cited

U.S. PATENT DOCUMENTS 7,608,943 B2 * 10/2009 Sekai ...................... G06F 1/263
                                                              307/64
7,836,322 B2 * 11/2010 Chapuis .................... G06F 1/26
                                                              323/282

(Continued)

FOREIGN PATENT DOCUMENTS

CN      101504996 A      8/2009
CN      103701182        4/2014

(Continued)

OTHER PUBLICATIONS

International Search Report issued for PCT/CN2016/074907 dated Apr. 20, 2016 (4 pages).

*Primary Examiner* — Yemane Mehari
(74) *Attorney, Agent, or Firm* — Young Basile Hanlon & MacFarlane, P.C.

(57) ABSTRACT

A power adapter includes an adapter main body configured to acquire an alternating current from a power source and convert the alternating current into a direct current having a specified voltage; an output port configured to acquire the direct current from the adapter main body, and supply the direct current to an external device via the positive output port and the negative output port; a current divider arranged between the positive output port and the negative output port, and configured to split the direct current from the adapter main body upon receiving a control signal, so as to cause a value of an output voltage output through the positive output port and the negative output port to be less than or equal to a preset value; and a processor configured to transmit the control signal to the current divider.

20 Claims, 2 Drawing Sheets

(58) Field of Classification Search
USPC .............................................. 363/89, 90, 142
See application file for complete search history.

(56) References Cited

U.S. PATENT DOCUMENTS

| | | | |
|---|---|---|---|
| 2005/0007063 A1* | 1/2005 | Sekai ..................... | G06F 1/263 |
| | | | 320/101 |
| 2009/0237850 A1 | 9/2009 | Wu et al. | |
| 2011/0148202 A1* | 6/2011 | Rada ........................ | G05F 1/70 |
| | | | 307/52 |
| 2013/0015714 A1* | 1/2013 | Kwok ....................... | H02J 1/10 |
| | | | 307/75 |
| 2014/0062191 A1* | 3/2014 | Bryson .................... | H02J 1/12 |
| | | | 307/26 |

FOREIGN PATENT DOCUMENTS

| | | |
|---|---|---|
| CN | 104113039 A | 10/2014 |
| CN | 104753367 A | 7/2015 |
| CN | 204559413 U | 8/2015 |

\* cited by examiner

POWER ADAPTER

CROSS REFERENCE TO RELATED APPLICATIONS

This application is a continuation application of international Patent Application PCT No. PCT/CN2016/074907, entitled "POWER ADAPTER", filed on Feb. 29, 2016, which claims priority to Chinese Patent Application No. 201510100431.X, filed on Mar. 6, 2015, entitled "POWER ADAPTER", contents of all of which are hereby incorporated in their entireties by reference.

TECHNICAL FIELD

The present disclosure relates to charging technical field, and more particularly to a power adapter.

BACKGROUND

Presently, electronic devices (e.g., mobile phones) are generally equipped with a rechargeable battery, thus the battery can be charged by a power adapter.

During charging, the power adapter converts an alternating current into a direct current having a specified voltage, and transmits the direct current to an electronic device. Furthermore, the electronic device includes a charging control circuit configured to control charging of the battery.

However, when a fault occurs in the charging control circuit, a charging voltage cannot be controlled. When the charging voltage is too great, the battery may be damaged and may even burst, accordingly usage safety can be greatly affected.

SUMMARY

In embodiments of the present disclosure, a power adapter is provided, which can improve safety of charging.

In a first aspect, a power adapter is provided. The power adapter may include: an adapter main body configured to acquire an alternating current from a power source and convert the alternating current into a direct current having a specified voltage; an output port comprising a positive output port and a negative output port both electrically coupled to the adapter main body, and configured to acquire the direct current from the adapter main body, and supply the direct current to an external device via the positive output port and the negative output port; a current divider arranged between the positive output port and the negative output port, and configured to split the direct current from the adapter main body upon receiving a control signal, so as to cause a value of an output voltage output through the positive output port and the negative output port to be less than or equal to a preset value; and a processor communicating with the current divider and configured to transmit the control signal to the current divider.

In a second aspect, a power adapter is further provided. The power adapter may include an adapter main body configured to acquire an alternating current from a power source and convert the alternating current into a direct current having a specified voltage; a processor; an output port; and a current divider coupled to an external device in parallel via the output port, and configured to split the direct current from the adapter main body under control of the processor, so as to cause a voltage value of the direct current to be less than or equal to a preset value. The output port is configured to supply the direct current the voltage value of which is less than or equal to the preset value to the external device.

In the embodiment of the present disclosure, by arranging the current divider between the positive output port and the negative output port, the voltage output through the positive output port and the negative output port can be reduced to be less than or equal to the preset value. which can avoid damage and burst of the battery, according usage safety is improved.

BRIEF DESCRIPTION OF THE DRAWINGS

To better illustrate the technical solution of embodiments of the present disclosure, the following descriptions will briefly illustrate the accompanying drawings described in the embodiments. Obviously, the following described accompanying drawings are some embodiments of the present disclosure. Those skilled in the art can obtain other accompanying drawings according to the described accompanying drawings without creative work.

DETAILED DESCRIPTION

The technical solution of embodiments of the present disclosure will be described clearly and completely in combination with the accompanying drawings of the embodiments of the present disclosure. Obviously, the described embodiments are a part of embodiments of the present disclosure, and not all of the embodiments. According to the embodiments of the present disclosure, other embodiments obtained by those skilled in the art without creative work all fall within the protection scope of the present disclosure.

Figure 1:
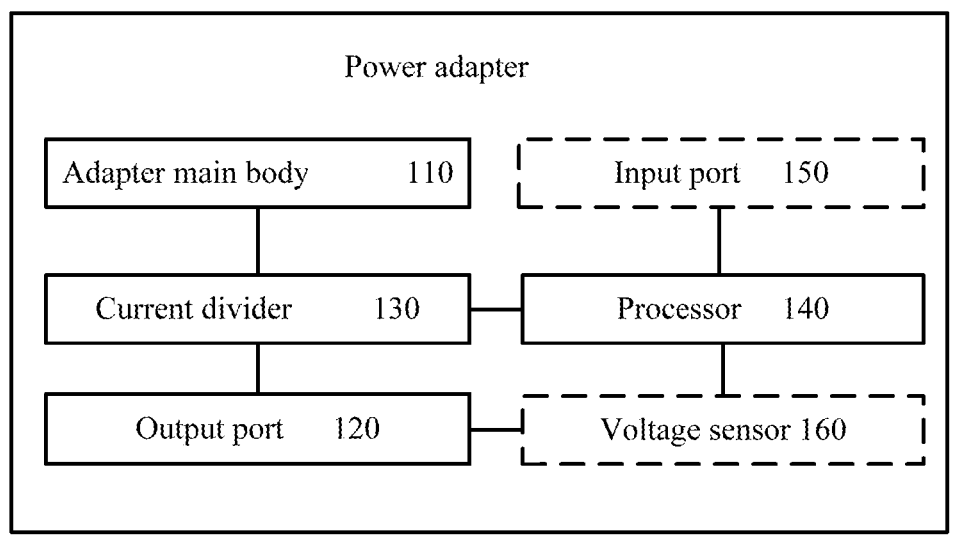
FIG. 1 is a diagrammatic view of a power adapter in accordance with an embodiment of the present disclosure.

FIG. 1 is a diagrammatic view of a power adapter 100 in accordance with an embodiment of the present disclosure. As illustrated by FIG. 1, the power adapter 100 includes an adapter main body 110, an output port 120, a current divider 130, and a processor 140.

The adapter main body 110 is configured to acquire an alternating current from a power source, and convert the alternating current into a direct current having a specified voltage.

The output port 120 includes a positive output port 122 and a negative output port 124 both electrically coupled to the adapter main body 110, and is configured to acquire the direct current from the adapter main body 110, and supply the direct current to an external device via the positive output port 122 and the negative output port 124.

The current divider 130 is arranged between the adapter main body 110 and the output port 120, and is configured to split the direct current from the adapter main body 110 upon receiving a control signal from the processor 140, so as to cause a value of a voltage output through the positive output port 122 and the negative output port 124 to be less than or equal to a preset value.

The processor 140 communicates with the current divider 130, and is configured to transmit the control signal to the current divider 130.

The following will specifically illustrate various elements of the power adapter 100.

A. Adapter Main Body 110

In the embodiment of the present disclosure, the adapter main body 110 can acquire the alternating current (or, AC voltage or AC current) from the power source, and perform an alternating-direct conversion operation on the alternating current to generate the direct current having the specified voltage (for example, less than or equal to 5V).

In addition, the following will illustrate the alternating-direct conversion process.

Firstly, a voltage transformation operation is performed on the alternating current having the 220V or 110V voltage and input by the grid, so as to acquire the alternating current having the specified voltage (for example, less than or equal to 5V).

A rectifying filter operation is performed on the alternating current after the alternating current undergoes a voltage reduction, so as to acquire the desired direct current.

It can be understood that the above process that the adapter main body 110 converts a high voltage alternating current into a low voltage direct current is just an example, and the present disclosure is not limited to this.

The output port 120 includes a positive output port 122 and a negative output port 124 both electrically coupled to the adapter main body 110, and is configured to acquire the direct current from the adapter main body 110, and supply the direct current to an external device 200 via the positive output port 122 and the negative output port 124.

B. Output Port 120

The output port 120 is coupled to an output port of the adapter main body 110, and can acquire the direct current having the specified voltage from the adapter main body 110, and transmit the direct current to the external device 200 via electrical lines.

Furthermore, the output port 120 can include the positive output port 122 and the negative output port 124.

Optionally, the output port 120 is configured to output the direct current to a mobile phone.

Specifically, in the embodiment of the present disclosure, the external device 200 can be a mobile phone. That is, the power adapter 100 charges a mobile phone. Accordingly, a specification and model of the output port 120 can be set to adapt to a corresponding charged object. For example, a universal serial bus (USB) interface (specifically, a USB interface for transmitting current) can be used as the output port 120.

C. Current Divider 130

In the embodiment of the present disclosure, the current divider 130 is arranged between the positive output port 122 and the negative output port 124.

For example, in the embodiment of the present disclosure, a port of the current divider 130 can be arranged between the positive output port 122 and a positive output port of the adapter main body 110, and the other port of the current divider 130 can be arranged between the negative output port 124 and a negative output port of the adapter main body 110.

That is, when the power adapter 100 is coupled to an external device 200 to charge the external device 200, the current divider 130 and the external device 200 are coupled in parallel, accordingly, the voltage output to the external device 200 can be adjusted as the current divider 130 splits the direct current from the adapter main body 110.

Furthermore, under a normal condition, the current divider 130 is in an off state, accordingly, under the normal condition, the direct current from the adapter main body 110 can fully flow into the output port 120 to be output to the external device 200. When the processor 140 determines that the voltage of the direct current needs to be reduced, the processor 140 can transmit the control signal to the current divider 130. When the current divider 130 receives the control signal, the current divider 130 switches to an on state, accordingly, the current divider 130 can split the direct current from the adapter main body 110 to reduce the value of the voltage of the direct current output through the output port 120 to be the preset value.

In addition, in the embodiment of the present disclosure, following elements can be used as the current divider 130.

For example, the current divider 130 includes a metal oxide semiconductor field effect transistor (MOSFET) switch.

Specifically, in the embodiment of the present disclosure, as the MOSFET has a cut-off characteristic, the MOSFET switch can be used as the current divider 130.

As an example rather than limitation, when it is determined that the direct current from the adapter main body 110 needs to be split, a voltage (for example, 4V or 10V) can be applied to a gate of the MOSFET (for example, N-MOSFET) to turn on the MOSFET, and the positive output port 122 and the negative output port 124 are coupled with each other when the MOSEFET is turned on. Therefore, by means of the MOSFET, the direct current output through the adapter main body 110 can be split, accordingly, the voltage output through the positive output port 122 and the negative output port 124 can be reduced.

It can be understood that the above method for using the MOSFET is just an example and not used to limit the present disclosure. Other elements which can realize the above function of the current divider 130 via the MOSFET all fall within the protection scope of the present disclosure.

Optionally, the current divider 130 includes a transistor switch.

Specifically, in the embodiment of the present disclosure, the above function of the current divider 130 can be realized by the transistor switch.

As an example rather than limitation, when the adapter main body 110 works normally, the output voltage of the adapter main body 110 is less than a forward voltage for turning on the transistor switch, or the output voltage of the adapter main body 110 is a reverse voltage for turning off the transistor switch. When it is determined that the direct current from the adapter main body 110 needs to be split, the forward voltage can be applied to the transistor switch to turn on the transistor switch, such that the direct current output through the adapter main body 110 is split by the transistor switch, accordingly, the voltage output through the positive output port 122 and the negative output port 124 can be reduced.

It can be understood that the above illustrated current divider 130 is just an example and not used to limit the present disclosure. For example, the current divider 130 can receive a signaling (for example, a digital signal) and recognize the signaling. When it is determined that the signaling indicates that the direct current from the adapter main body 110 needs to be split, the current divider 130 splits the direct current from the adapter main body 110 to reduce the output voltage of the power adapter 100.

In the embodiment of the present disclosure, the current divider 130 can further include a switch (for example, a normally open relay switch) and a resistor (for example, a fixed resistor and a variable resistor). When it is determined that the direct current from the adapter main body 110 needs to be split, the normally open relay switch can be controlled to be turned on, so as to cause the positive output port 122 and the negative output port 124 to be coupled with each other via the resistor, cause the direct current output through the adapter main body 110 to be split via the resistor, and reduce the voltage output through the positive output port 122 and the negative output port 124.

D. Processor 140

In the embodiment of the present disclosure, the processor 140 communicates with the current divider 130. Furthermore, whether the output voltage of the power adapter 100 needs to be reduced is determined. When the determination result is yes, the control signal is transmitted to the current divider 130 to cause the current divider 130 to work.

Furthermore, as an example rather than limitation, the following illustrates how to determine whether the output voltage of the power adapter 100 needs to be reduced.

Manner 1

Optionally, the power adapter 100 further includes an input port 150 which communicates with the processor 140, and is configured to receive information from the external device 200, and transmit the information to the processor 140.

The processor 140 is configured to transmit the control signal to the current divider 130 when information for indicating that the output voltage needs to be reduced is received from the external device 200 via the input port 150.

Specifically, in the embodiment of the present disclosure, the processor 140 of the power adapter 100 can receive information from an external device 200 (for example, a mobile phone) via the input port 150. Therefore, for example, when the external device 200 determines that a fault occurs in a charging control circuit of the external device 200, or when the external device 200 determines that a value of the voltage provided by the power adapter 100 is greater than a value of a secure voltage, the external device 200 can transmit the information for indicating that the output voltage needs to be reduced to the power adapter 100 via the input port 150. When the processor 140 receives the information, the processor 140 transmits the control signal to the current divider 130 to cause the current divider 130 to work.

Furthermore, in the embodiment of the present disclosure, for example, a USB interface (specifically, a USB interface for transmitting information) can be used as the input port 150.

Manner 2

Optionally, the power adapter 100 further includes a voltage sensor 160 which communicates with the processor 140, and is configured to detect the voltage value of the direct current, and transmit the voltage value to the processor 140.

The processor 140 transmits the control signal to the current divider 130 when the voltage value is greater than a preset voltage threshold.

Specifically, in the embodiment of the present disclosure, the voltage sensor 160 (for example, a voltmeter) can be set to detect the voltage value of the direct current output through the positive output port 122 and the negative output port 124, and transmit the voltage value to the processor 140.

Furthermore, a voltage threshold can be stored beforehand. Therefore, when the processor 140 determines that the voltage value of the direct current output through the positive output port 122 and the negative output port 124 and detected by the voltage sensor 160 is greater than or equal to the voltage threshold, the processor 140 can transmit the control signal to the normally open switch element 130.

What needs to be illustrated is that the voltage sensor 160 can further detect the voltage of the direct current output through the adapter main body 110, and the present disclosure is not limited to this.

Furthermore, in the embodiment of the present disclosure, the voltage threshold can be determined according to the specification or type of the battery of the external device 200, for example, the voltage threshold can be 4.35V.

It can be understood that in the embodiment of the present disclosure, the processor 140 can be a central processing unit (CPU), and can be also a general processor, for example, a digital signal processor (DSP), an application specific integrated circuit (ASIC), a field programmable gate array (FPGA), a programmable logic device, a discrete gate or transistor logic device, a discrete hardware element, or the like. The general processor can be a micro processor, or any normal processor.

The integrated logic circuit in the form of hardware or instructions in the form of software of the processor 140 finishes the implementation procedure. The steps of the processing method of the embodiment of the present disclosure can be finished by the hardware processor, or by the hardware and software modules of the processor. The software modules can be stored in a random access memory, a flash memory, a read-only memory, a programmable read-only memory, an electrically erasable programmable memory, a register, or a storage medium of the technical field. The storage medium is in a memory, and the processor 140 reads information of the memory to finish the above processing method in combination with hardware, which will not be specifically described herein to avoid repetition.

Figure 2:
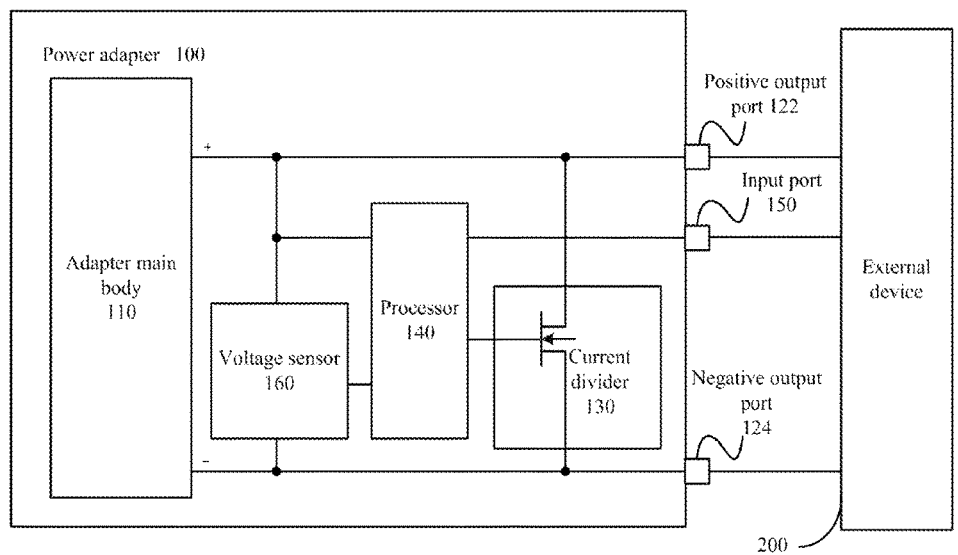
FIG. 2 is a schematic circuit diagram of a power adapter in accordance with an embodiment of the present disclosure.

FIG. 2 is a schematic view showing coupling of various elements of the power adapter in accordance with an embodiment of the present disclosure. As illustrated by FIG. 2, the adapter main body 110 can include a positive output port (that is, "+" of FIG. 2) and a negative output port (that is, "−" of FIG. 2). The positive output port of the adapter main body 110 is coupled to the positive output port 122 of the power adapter 100, and the negative output port of the adapter main body 110 is coupled to the negative output port 124 of the power adapter 100.

The voltage sensor 160 is arranged between the positive output port and the negative output port of the adapter main body 110, or the voltage sensor 160 is arranged between the positive output port 122 and the negative output port 124, so as to detect the output voltage of the adapter main body 110 (that is, the output voltage of the power adapter 100).

The current divider 130 is arranged between the positive output port 122 and the negative output port 124. When the power adapter 100 is coupled to the external device 200 to charge the external device 200, the current divider 130 and the external device 200 are coupled in parallel.

What needs to be illustrated is that the setting of the current divider 130 illustrated above is just an example, and the present disclosure is not limited to this. What is needed is that the current divider 130 and the external device 200 are coupled in parallel.

The processor 140 can be arranged between the positive output port and the negative output port of the adapter main body 110, thus power can be supplied to the processor 140 via the adapter main body 110. Furthermore, the processor 140 communicates with the voltage sensor 160, thus the processor 140 can acquire data detected by the voltage sensor 160. Furthermore, the processor 140 further communicates with the input port 150, thus the processor 140 can receive indication information from the external device 200 via the input port 150. Furthermore, the processor 140 is electrically coupled to the current divider 130, thus the processor 140 can transmit the control signal (for example, an electrical signal, that is, applying a voltage) to the current divider 130. Therefore, the processor 140 can determine whether to enable the current divider 130 according to the detected data or the indication information. When the determination result is yes, the processor 140 transits the control signal to the current divider 130 to cause the current divider 130 to work, thus the direct current output through the adapter main body 110 is split by the current divider 130, and the value of the voltage of the direct current output through the output port 120 can be reduced to be the preset value.

In the embodiment of the present disclosure, by arranging the current divider between the positive output port and the negative output port, the voltage output through the positive output port and the negative output port can be reduced to be less than or equal to the preset value, which can avoid damage and burst of the battery, according usage safety is improved.

Those skilled in the art can appreciate that units and steps of various examples described in the embodiments of the present disclosure can be realized by electronic hardware or a combination of computer software and electronic hardware. Whether these functions are realized by hardware or software depends on particular applications and design constraint conditions. For each particular application, professionals can employ different methods to realize described functions, but this realization should fall into the scope of the present disclosure.

In several embodiments provided by the present disclosure, it can be understood that the disclosed systems, devices, and methods can be implemented by other manners. For example, the device embodiments described above are only schematic. For example, the units are divided according to logic functions and can be divided by another manner in an actual implementation. For example, several units or assemblies can be combined or can be integrated into another system, or some features can be ignored, or are not executed. Another point is that mutual coupling or direct coupling or communication connection shown or discussed herein can be indirect coupling or communication connection through certain interfaces, devices, or units, and can be in the form of electricity, machine, or other.

The units illustrated as separate units can be or cannot be physically separated, and components shown in units can be or cannot be physical units, that is, can be in a place, or can be distributed in several network units. A part of or all of the units can be selected according to actual need to realize the purpose of the solution of the embodiments.

The present disclosure may include dedicated hardware implementations such as application specific integrated circuits, programmable logic arrays and other hardware devices. The hardware implementations can be constructed to implement one or more of the methods disclosed herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

The foregoing descriptions are merely preferred embodiments of the present disclosure, rather than limiting the present disclosure. Any one skilled in the art can easily make change or alterations within the technology range of the present disclosure, and those change or alterations shall fall within the protection scope of the present disclosure. Therefore, the protection scope of the present disclosure shall be limited by the protection scope of the claims.

What is claimed is:

1. A power adapter comprising:
    an adapter main body configured to acquire an alternating current from a power source and convert the alternating current into a direct current having a specified voltage;
    an output port comprising a positive output port and a negative output port both electrically coupled to the adapter main body, and configured to acquire the direct current from the adapter main body, and supply the direct current to an external device via the positive output port and the negative output port;
    a current divider arranged between the positive output port and the negative output port, and configured to split the direct current from the adapter main body upon receiving a control signal, so as to cause a value of an output voltage output through the positive output port and the negative output port to be less than or equal to a preset value; and
    a processor communicating with the current divider and configured to transmit the control signal to the current divider.

2. The power adapter of claim 1, wherein the power adapter further comprises:
    an input port communicating with the processor, and configured to receive information from the external device and transmit the information to the processor; and
    the processor is configured to transmit the control signal to the current divider upon receiving information for indicating that the output voltage needs to be reduced from the external device via the input port.

3. The power adapter of claim 2, wherein the information for indicating that the output voltage needs to be reduced is received from the external device when the external device determines that a fault occurs in a charging control circuit of the external device, or when the external device determines that a value of the voltage provided by the power adapter is greater than a value of a secure voltage.

4. The power adapter of claim 1, wherein the power adapter further comprises:
    a voltage sensor communicating with the processor, and configured to detect a voltage value of the direct current and transmit the voltage value to the processor; and
    the processor is configured to transmit the control signal to the current divider when it is determined that the voltage value is greater than the preset value.

5. The power adapter of claim 4, wherein the processor is further configured to control the current divider to split the direct current from the adapter main body according to the voltage value.

6. The power adapter of claim 1, wherein the current divider comprises a transistor switch.

7. The power adapter of claim 1, wherein the output port comprises a universal serial bus.

8. The power adapter of claim 1, wherein the current divider and the external device are coupled in parallel.

9. The power adapter of claim 1, wherein the control signal is a digital signal.

10. A power adapter comprising:
    an adapter main body configured to acquire an alternating current from a power source and convert the alternating current into a direct current having a specified voltage;

a processor;

an output port; and a current divider coupled to an external device in parallel via the output port, and configured to split the direct current from the adapter main body under control of the processor, so as to cause a voltage value of the direct current to be less than or equal to a preset value;

the output port configured to supply the direct current the voltage value of which is less than or equal to the preset value to the external device.

11. The power adapter of claim 10, wherein the output port comprises a positive output port and a negative output port both electrically coupled to the adapter main body, and the direct current the voltage value of which is less than or equal to the preset value is supplied to the external device via the positive output port and the negative output port.

12. The power adapter of claim 10, wherein the power adapter further comprises:

an input port communicating with the processor, and configured to receive indication information from the external device, and the indication information indicates that the output voltage needs to be reduced; and the processor is configured to control the current divider to split the direct current from the adapter main body upon receiving the indication information via the input port.

13. The power adapter of claim 12, wherein the information for indicating that the output voltage needs to be reduced is received from the external device when the external device determines that a fault occurs in a charging control circuit of the external device, or when the external device determines that a value of the voltage provided by the power adapter is greater than a value of a secure voltage.

14. The power adapter of claim 10, wherein the power adapter further comprises:

a voltage sensor communicating with the processor, and configured to detect a voltage value of the direct current and transmit the voltage value to the processor; and the processor is configured to control the current divider to split the direct current from the adapter main body when it is determined that the voltage value is greater than the preset value.

15. The power adapter of claim 14, wherein the processor is further configured to control the current divider to split the direct current from the adapter main body according to the voltage value.

16. The power adapter of claim 10, wherein the current divider comprises a metal-oxide -semiconductor field effect transistor switch.

17. The power adapter of claim 10, wherein the output port comprises a universal serial bus.

18. The power adapter of claim 10, wherein the processor is configured to transmit a digital signal to the current divider to control the current divider to split the direct current from the adapter main body.

19. The power adapter of claim 1, wherein, the adapter main body is configured to perform a voltage transformation operation on the alternating current acquired from the power source to acquire another alternating current having the specified voltage, and is configured to perform a rectifying filter operation on the another alternating current after the alternating current undergoes a voltage reduction, thus to acquire the direct current having the specified voltage.

20. The power adapter of claim 10, wherein, the adapter main body is configured to perform a voltage transformation operation on the alternating current acquired from the power source to acquire another alternating current having the specified voltage, and is configured to perform a rectifying filter operation on the another alternating current after the alternating current undergoes a voltage reduction, thus to acquire the direct current having the specified voltage.

* * * * *